Figure 3:
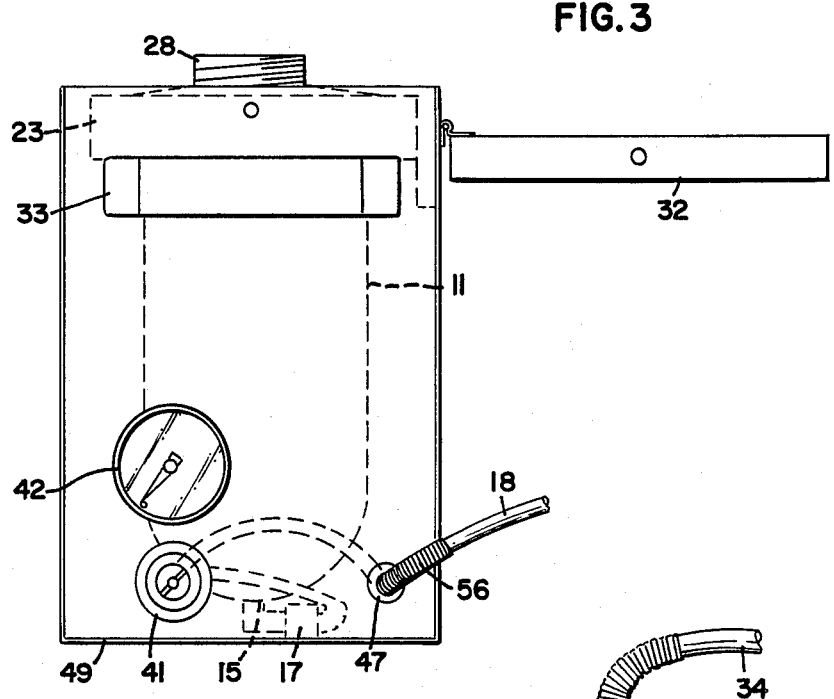

United States Patent [19]

Thomas

[11] Patent Number: 4,867,341

[45] Date of Patent: Sep. 19, 1989

[54] METHOD AND APPARATUS FOR DISPENSING POWDERED PESTICIDE

[75] Inventor: John E. Thomas, River Falls, Wis.

[73] Assignee: Ecolab, Inc., St. Paul, Minn.

[21] Appl. No.: 49,710

[22] Filed: May 13, 1987

[51] Int. Cl.[4] .............................................. B67B 7/00
[52] U.S. Cl. ........................................ 222/1; 222/630
[58] Field of Search .................. 222/1, 630, 195, 396, 222/529; 406/38, 90, 146, 136, 141; 239/310, 315, 316

[56] References Cited

U.S. PATENT DOCUMENTS

| | | | |
|---|---|---|---|
| 2,327,337 | 8/1943 | Burch | 406/146 X |
| 2,501,047 | 3/1950 | Gustafsson et al. | 406/136 |
| 2,586,761 | 2/1952 | Eskola | 119/157 |
| 2,922,586 | 1/1960 | Harding | 241/19 |
| 2,924,489 | 2/1960 | Beckmann | 406/146 X |
| 3,004,721 | 10/1961 | Notzold | 241/5 |
| 3,168,254 | 2/1965 | Kilboy | 241/19 |
| 3,524,594 | 8/1970 | Anderson | 241/19 |
| 3,542,298 | 11/1970 | Klesskalt | 241/19 |
| 4,364,521 | 12/1982 | Stankowitz | 239/397 X |
| 4,371,295 | 2/1983 | Hart | 406/128 |
| 4,439,072 | 3/1984 | Goedken | 406/91 |
| 4,474,327 | 10/1984 | Mattson et al. | 406/38 X |
| 4,561,598 | 12/1985 | Musschoot | 241/19 |
| 4,600,129 | 7/1986 | Kondo | 406/38 X |
| 4,678,377 | 7/1987 | Bouchard | 222/630 |

FOREIGN PATENT DOCUMENTS 980431  1/1965  United Kingdom ................ 406/146

OTHER PUBLICATIONS

Porex Technology Bulletin, *Porex Technologies,* 1985, Fairburn, Georgia 30213.

Primary Examiner—Joseph J. Rolla
Assistant Examiner—Gregory L. Huson
Attorney, Agent, or Firm—Merchant, Gould, Smith, Edell, Welter & Schmidt

[57] ABSTRACT

Disclosed is a method and apparatus (10) for dispensing powdered pesticide (13). A housing (11) is separated into an upper chamber (12) and lower chamber (51) by a porous media layer (19). The powdered pesticide (13) is contained within the upper chamber (13) and is fluidized when compressed air enters the dispenser from air inlet line (18). The fluidized pesticide is dispensed through outlet line (34) and nozzle (36) when a control valve (50) is activated. Only particles having a size smaller than a predetermined size are dispensed; the remaining, relative large pesticide particles remain in the upper chamber until physically removed.

1 Claim, 3 Drawing Sheets

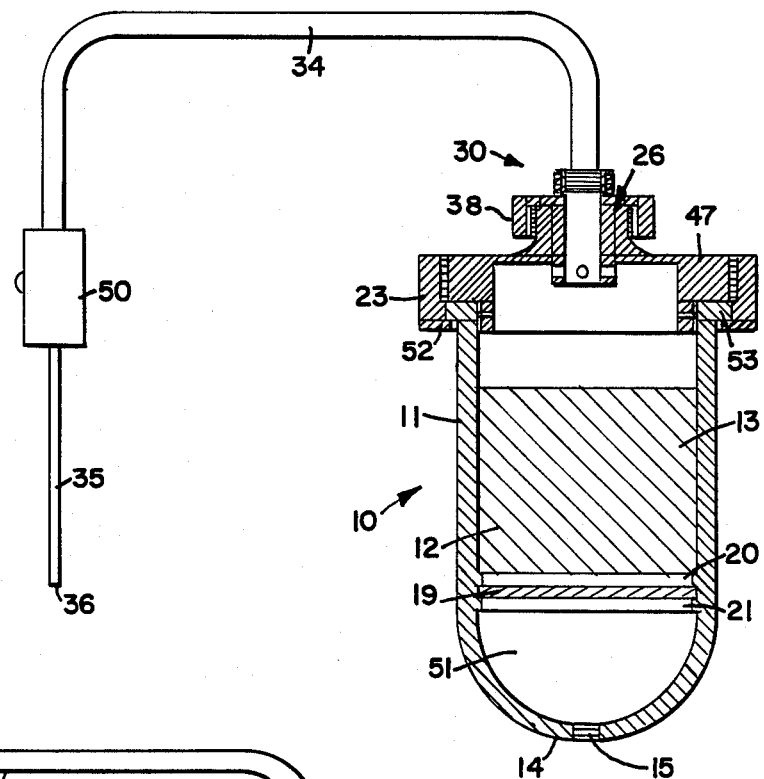

METHOD AND APPARATUS FOR DISPENSING POWDERED PESTICIDE

FIELD OF THE INVENTION

The present invention relates to dispensers for powdered pesticide, and more particularly to an apparatus for dispensing fluidized powdered pesticide particles of a desired size.

BACKGROUND OF THE INVENTION

Pests and insects can adversely affect the livableness, health and sanitation of areas in which humans live and work. Cockroaches in particular have become common household pests. Cockroaches can chew foodstuffs, clothing, paper, and even plastic insulation. Cockroaches can also produce allergenic reactions in humans and can emit a highly disagreeable odor. Thus, it is desirable to be able to eliminate cockroaches and other pests efficiently, inexpensively, and with no adverse effects to humans or pets.

Boric acid has been proven to be a common, effective pesticide which is safe and non-toxic to humans. The powdered boric acid works by attaching itself to the insect's body. The insect then ingests or licks the boric acid when cleaning itself. The boric acid particles also act to abrade the insect's outer body, causing the insect to dehydrate. Silica gel and boric acid containing pyrethin can also be used.

Dispensers are available which dispense powdered boric acid through a wand and into cracks and crevices. However, conventional dispensers of boric acid exhibit several operational disadvantages. Typically, they dispense too much pesticide, dispensing great quantities of pesticide and very little air. Some dispensers also dispense a large amount of pesticide alternated by blasts of air, rather than a controlled, uniform pesticide-air mixture. These conventional dispensers are consequently less effective, because they result in wasted pesticide and "piles" of pesticide which the insects avoid.

Another problem with conventional dispensers is that they do not segregate the boric acid by particle size and therefore they dispense relatively large particles. These oversized particles are too large to attach to the cockroach's or insect's body and are consequently ineffective and wasteful.

The dispensers currently available also sometimes get wet inside and are prone to plugging. This requires the operator to disassemble the dispenser, a procedure which is inconvenient and time consuming.

SUMMARY OF THE INVENTION

The present invention addresses many of the above difficulties with conventional pesticide dispensers. According to one aspect of the present invention, there is an apparatus for dispensing powdered pesticide. The dispenser includes a hollow housing which is separated into an upper and lower chamber by a porous media layer. An aperture in the lower chamber admits pressurized air from an air inlet line. Powdered pesticide is contained within the upper chamber and is fluidized by the pressurized air. Means for outletting the fluidized pesticide are included to deliver the pesticide to the utilization point. The apparatus dispenses only pesticide particles having a particle size smaller than a predetermined size, and particles larger than that predetermined size are retained in the upper chamber.

According to another aspect of the invention, there is disclosed a method for dispensing powdered pesticide. The method includes: placing the powdered pesticide in the dispenser's upper chamber, supplying pressurized air, fluidizing the powdered pesticide in the upper chamber, and blowing the pesticide particles having a particles size smaller than a predetermined size through the outlet line. Another aspect of the inventive method is the removal of the dispenser particles having a particle size larger than the predetermined size, grinding the remaining large particles, and then reintroducing the ground particles into the dispenser of the present invention.

An important advantage of the present invention is its ability to segregate particles of powdered pesticide so that only the desired sized particles are dispensed. By dispensing only small, fine particles of boric acid, a fine layer or dusting is produced on the surface of the floor or wall. The insects unknowingly walk through the thin layer of pesticide, so that the small particles effectively attach to the insects' outer body.

Another feature of the present invention is that it dispenses an appropriate, controlled amount of pesticide. The construction of the present invention allows it to dispense a proper air-to-pesticide ratio, thus eliminating waste and "piles" of pesticide which the insects will avoid.

The dispenser of the present invention is also simple in construction and relatively inexpensive. Because of its construction and the flow of air therethrough, plugging problems are minimized and the operator need not periodically disassemble the dispenser. Consequently, the pest technician can complete his job in a minimum amount of time.

These and other objects of the invention will become apparent from a consideration of the following specification and accompanying drawings which form a part of this application.

In carrying out the objects of the invention, it is to be understood that its essential features are susceptible to change in design and structural arrangement, with only one preferred and practical embodiment being illustrated in the accompanying drawings, as required.

BRIEF DESCRIPTION OF THE DRAWINGS

In the accompanying drawings, wherein like numerals of reference appear to similar parts throughout:

FIG. 1 is a side view, partially in section, of the pesticide housing for the dispensing apparatus of the present invention;

FIG. 2 is an exploded side view, partially in section, of the pesticide housing shown in FIG. 4;

FIG. 3 is a side elevational view of the dispenser container for the dispensing apparatus of the present invention, with the pesticide housing shown in phantom;

FIG. 4 is a side elevational view of the pesticide housing shown in FIG. 1; and FIG. 5 is a top view of the pesticide container shown in FIG. 3 with the pesticide housing shown in phantom.

DESCRIPTION OF THE PREFERRED EMBODIMENT

The pesticide dispenser of the present invention is shown generally at 10. It includes a substantially hollow housing or bowl 11 which is divided into an upper chamber 12 and a lower chamber 51. In the preferred embodiment, the housing 11 is elongated in the vertical direction and has a circular cross-section, with its lower end 14 being concave. The housing 11 is streamlined and contoured to facilitate airflow therethrough. The upper end of the housing 11 is a large opening 55, which is closed off by an outlet assembly 30. When pesticide is loaded into the housing 11, it goes through the opening 55 after the outlet assembly 30 has been removed. Preferably, the housing 11 is made of a lightweight plastic material which is substantially transparent. In the preferred embodiment, the length of the housing 11 is approximately eight (8) inches, with a diameter of approximately four (4) inches.

The lower end 14 of the housing 11 includes an inlet orifice 15. An L-shaped adapter 16 is attached to the housing 11 and extends through the inlet orifice 15. The opposite end of the adapter 16 is interconnected through a threaded joint 17 to an air line 18.

The upper and lower chambers 12, 51 are separated by a transverse, flat, porous media 19, so that the media 19 constitutes the bottom of the upper chamber 12 and the top of the lower chamber 51. In the preferred embodiment, the longitudinal access of the housing 11 is substantially vertical, whereas the porous media 19 is horizontal. The porous media 19 extends across the entire cross-section of the housing 11. Preferably, the porous media 19 is made of a porous plastic material. As shown in FIGS. 1 and 2, the porous media 19 is positioned approximately one-third of the length of the housing 11 from the housing's lower end 14, so that the upper chamber 12 is larger than the lower chamber 51. The porous media 19 is positioned within the housing 11 by means of upper 20 and lower 21 supports. The supports 20, 21 are preferably annular, plastic rings whose diameter is slightly less than the diameter of the housing 11. The outside wall of each annular support 20, 21 is positioned flush against the inside wall of the housing 11 and is securely attached at the desired location by means of suitable fasteners 22, such as screws.

Contained within the upper chamber 12 is a powdered pesticide 13. In the preferred embodiment, the powdered pesticide 13 is boric acid. Before the pesticide dispenser 10 is activated, the pesticide 13 is supported by the porous media 19 which constitutes the bottom of the upper chamber 12.

The outlet assembly 30 of the housing 11 includes a substantially horizontal cylindrical locking ring 23 which is larger than the diameter of the housing 11. The locking ring 23 acts to hold a top ring 47 in place on the housing. The lower edge of the locking ring 23 has an extension portion 52 which is positioned against the underside of the lip 53 of the housing or bowl 11, as shown in FIG. 1. The inner surface of the locking ring 23 is threaded around its circumference to accommodate the outer threads on the top ring 47. The locking ring 23 includes a plurality of knobs 46 which facilitate gripping of the locking ring 23 when screwing or unscrewing.

The top ring 47 has a lower, large cylindrical base 54 and an integral upper, smaller cylindrical portion 48. The base 54 acts as a cap upon the upper opening 55 of the housing 11 and has a diameter approximately equal to the diameter of the housing 11. The outer surface of the base portion 47 is threaded to accommodate the locking ring 23, and the outer surface of the cylindrical portion 48 is threaded to accommodate a top cap 38. The top ring 47 includes a lower large cylindrical opening 24 and an upper smaller cylindrical opening 25 within the large and small cylindrical portions 54, 48 respectively.

Insertable within the opening 25 is a hollow, cylindrical adapter 26 which has a diameter slightly smaller than the opening 25. The adapter 26 has a horizontal, annular flange 27 approximately midway along its length and threaded portion 28 proximate its upper end. The lower portion of the adapter 26 includes a plurality of radial holes 29 around the circumference of the adapter 26 and on the bottom thereof.

The present invention also includes a container 31 for the dispenser housing 11 which serves to protect its components. The container 11 preferably has a flat bottom 49 and a hinged lid 32 at its upper end. The container has one or more handles 33, which makes the pesticide dispenser of the present invention portable for the pest technician. In the preferred embodiment, the container 31 is made of a lightweight yet sturdy material such as stainless steel.

The locking ring 23 and top ring 47 are preferably removed for easy filling of the upper chamber 12 with the pesticide 13 through the opening 55. They are then replaced and the outlet assembly 30 reassembled before operation.

Connected with the outlet assembly 30 is an outlet tube 34. Suitable fasteners 40 are used to interconnect the outlet assembly 30 to the outlet line 34. The outlet tube is preferably of sufficient length so that the pest technician can set down the container 31 periodically during the dispensing operation. The distal end of the outlet tube 34 is preferably a wand 35 having a nozzle 36 of the type which is conventional for dispensing pesticides. A control valve 50 is interconnected between the outlet line 34 and wand 35 to regulate the flow of the pesticide 13 as desired.

As is shown in FIG. 3, the hinged lid 32 of the container 31 includes a substantially oval opening 37. After the outlet assembly 30 is positioned in place upon the top of the housing 11, the hinged lid 32 of the container 31 is closed so that the outlet assembly 30 extends through the opening 37 in the lid 32. The top cap 38 is then screwed on the cylindrical portion 48 of the outlet assembly until the bottom of the cap 48 is flush against the lid 32. The diameter of the cap 38 is larger than the width of the aperture 37 in the lid. In this manner, the housing 11 is securely positioned within the container 31. The cap 38 is annular, and has a shoulder portion 39 which mates against the annular lip 27 of the adapter 26.

The air inlet line 18 communicates with an aperture 47 in the lower part of the container 31. In the preferred embodiment, the container 31 includes proximate its bottom an integral tube 47 extending outside the container 31 for receipt of the air inlet tube 18. A suitable fastener 56 is used to interconnect the inlet tube 18 with the tube 47. Preferably, the air inlet line 18 is regulated by a pressure regulator 41 and gauge 42 mounted on the side of the container 31. As shown in FIG. 3, the air inlet line 18 runs through the regulator 41 before entering the inlet orifice 15 at the bottom of the housing 11.

The position of the pesticide housing 11 is maintained within the container 31 by means of a flange 45 connected to the inside of one of the container's side walls. The locking ring 23 includes an extension portion 44 which inserts within the flange 45. The flange 45 and extension portion 44 are sized and shaped compatibly so that the housing 11 does not move within the container 31. The housing 11 also includes a plurality of legs 43 for supporting the device on the of the container 31.

Figure 4:
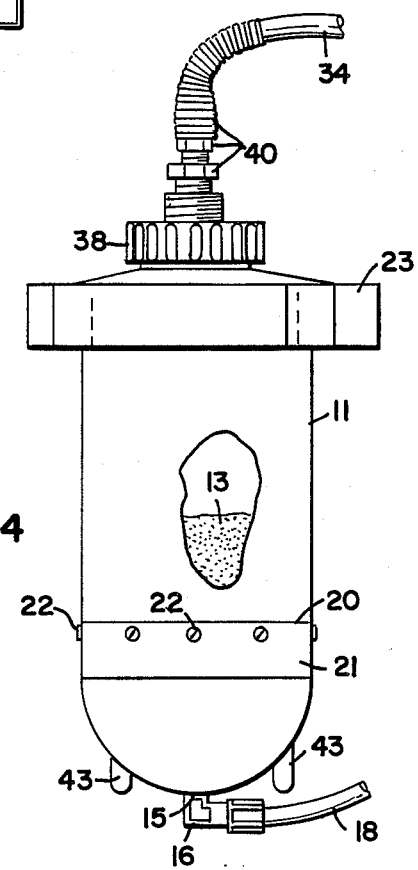
Figure 5:
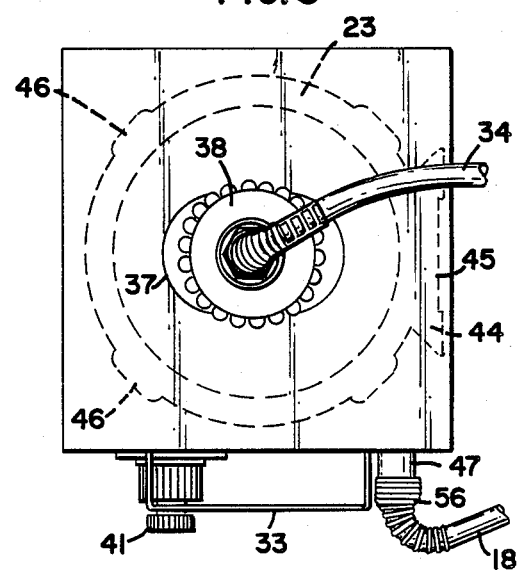

In operation, the powdered pesticide 13 is loaded into the upper chamber 12 (as shown in FIGS. 1, 2 and 4) and the outlet assembly is positioned in place. Compressed air is then directed through the air inlet line 18, and the desired air pressure is adjusted and maintained by the regulator 41. The air enters the lower chamber 51 and passes upward through the layer of porous media 19 and into the powdered pesticide 13. The air then acts upon the pesticide 13 to form a fluidized bed of material, in which the particles of pesticide are suspended in the air. The fluidized pesticide materials are forced to pass through the outlet assembly 30 and into the outlet line 34.

However, only pesticide particles having a size smaller than a predetermined size pass outside the upper chamber 12 and are dispensed. Particles having a larger than predetermined size remain in the upper chamber 12 and are maintained there by the force of gravity. But the smaller pesticide particles are carried by the air into the outlet line 34. By allowing only the smaller particles to go up into the outlet assembly 30 and out the nozzle 36, no large "chunks" of pesticide are dispensed, and a fine layer or dusting of pesticide is produced, which is highly effective against pests such as cockroaches.

The user positions the nozzle 36 on the wand 35 at the desired utilization point. Most insects tend to live in narrow crevices and under debris, and the nozzle 36 is directed where necessary. The operator then actuates the control valve 50 which allows a controlled amount of fluidized pesticide to exit through the nozzle 36. The valve 50 remains open as long as desired, as the operator moves the wand 35 and nozzle 36 along cracks and crevices.

Eventually, all of the smaller pesticide particles will be dispensed in this fluidized state, and only the particles which are relatively large will remain in the upper chamber 12. Although air may continue to flow through the device for an extended period of time, there will be insufficient air pressure to transport the large, undesirable pesticide particles into the outlet line 34. Thus, after all of the small, desirable particles have been dispensed, only air will flow through the outlet line, not the large particles. At this point, therefore, the air pressure can be deactivated and the outlet assembly 30 can be removed from the top of the upper chamber 12. The large remaining particles can then be removed. The large pesticide particles can either be disposed of or ground to a smaller size and then reintroduced into the dispenser.

It is to be understood that numerous and various modifications can be readily devised in accordance with the principles of the present invention by those skilled in the art without departing from the spirit and scope of the invention. Therefore, it is not desired to restrict the invention to the particular construction illustrated and described, but to cover all modifications that may fall within the scope of the appended claims.

What is claimed is:

1. A method for dispensing powdered pesticide, comprising the steps of:

(a) placing a quantity of powdered pesticide in an upper chamber of a dispenser, said pesticide being supported upon a porous media which forms a bottom for said upper chamber;

(b) supplying pressurized air to a lower chamber of said dispenser, said pressurized air being directed toward an outlet orifice which is in fluid communication with said upper chamber;

(c) fluidizing said powdered pesticide in said upper chamber by air flow through said porous media and into said upper chamber;

(d) blowing pesticide particles through an outlet line via said pressurized air;

(e) guiding a nozzle connected to said outlet line proximate a utilization point;

(f) activating a valve to open said outlet line so as to allow fluidized pesticide to pass through said nozzle to said utilization point;

(g) adjusting air pressure in an air inlet line with a pressure gauge and regulator;

(h) discontinuing air flow through said dispenser when fluidized powdered pesticide substantially ceases to travel into said outlet line;

(i) removing from said dispenser particles having a particle size larger than a predetermined size which remains inside the dispenser;

(j) grinding the remaining particles to a size smaller than said predetermined size; and (k) placing said ground powdered pesticide in said upper chamber of said dispenser for fluidization and dispensing.

* * * * *